Dec. 12, 1967 W. A. CLAY 3,357,770
STEREOSCOPIC VIEWING APPARATUS WHICH INCLUDES A CURVED
LENTICULAR SCREEN IN FRONT OF A CURVED
PICTURE SUPPORTING SURFACE
Original Filed Oct. 2, 1961 4 Sheets-Sheet 1

*INVENTOR.*
WALLACE A. CLAY

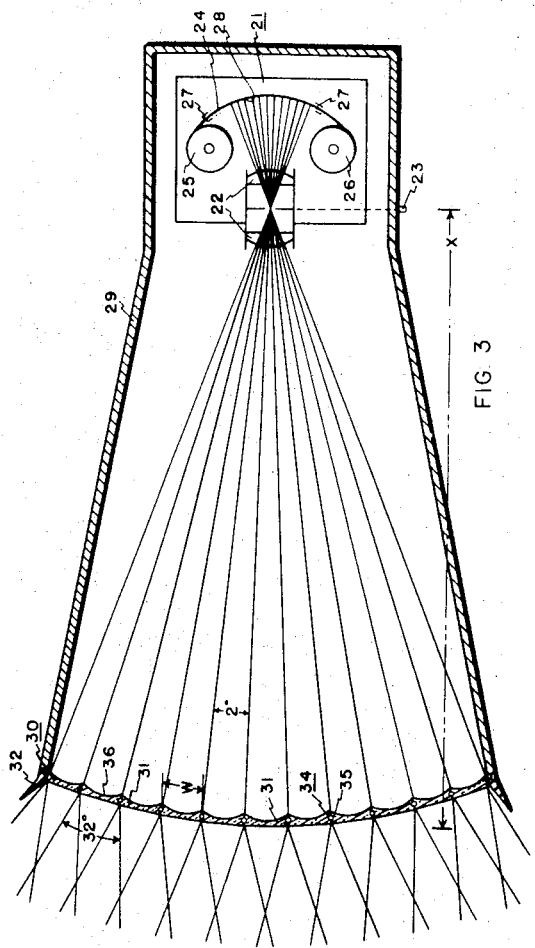
FIG. 3
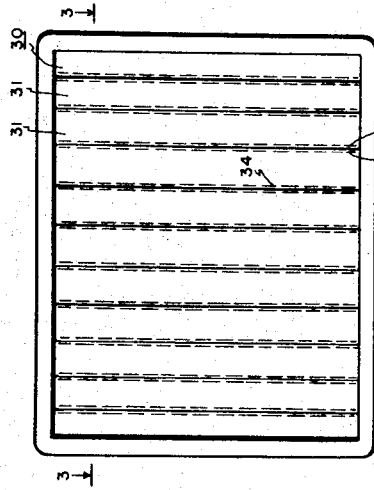
FIG. 2
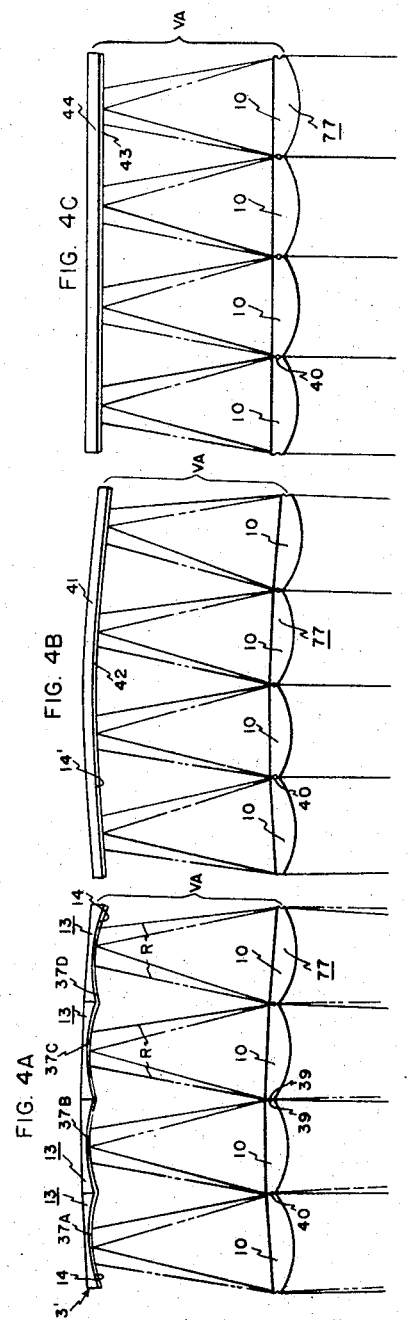
FIG. 4C
FIG. 4B
FIG. 4A
INVENTOR.
WALLACE A. CLAY Dec. 12, 1967 W. A. CLAY 3,357,770
STEREOSCOPIC VIEWING APPARATUS WHICH INCLUDES A CURVED
LENTICULAR SCREEN IN FRONT OF A CURVED
PICTURE SUPPORTING SURFACE
Original Filed Oct. 2, 1961 4 Sheets-Sheet 4

INVENTOR.
WALLACE A. CLAY

United States Patent Office

3,357,770
Patented Dec. 12, 1967

3,357,770
STEREOSCOPIC VIEWING APPARATUS WHICH INCLUDES A CURVED LENTICULAR SCREEN IN FRONT OF A CURVED PICTURE SUPPORTING SURFACE
Wallace A. Clay, Ogden, Utah, assignor to Intermountain Research and Engineering Company, Inc., Salt Lake City, Utah, a corporation of Utah
Original application Oct. 2, 1961, Ser. No. 142,401, now Patent No. 3,225,672. Divided and this application Aug. 9, 1965, Ser. No. 478,388
9 Claims. (Cl. 350—131)

This is a division of United States patent application, Ser. No. 142,401, filed Oct. 2, 1961, now Patent No. 3,225,672 and entitled, Stereoscopic Photographing and Projecting Apparatus and Method.

The present invention relates to three-dimensional photography and reproduction apparatus and, more particularly, to a unique method and apparatus therefor, for reproducing panoramic scenes three-dimensionally in a true, stereoscopic manner.

Outside the scope of the present invention are considerations of means and methods for simulating or, in part, contributing to forms of depth perception which are not, optically, true stereoscopic subjects in the limited sense.

By way of introduction, it should be mentioned that any number of means have been devised heretofore for reproducing stereoscopically desired subjects in a manner as to achieve a true depth dimension thereof. In the past there have been used prisms, employing reflecting return-lanes, optical separating networks involving illuminated wheels, masking grids associated with interlaced series of transparency strips, and even sceneline interlacing optical networks for producing stereoscopically desired close-up scenes. The movie-goer has also become familiar with viewer glasses having polarized lenses which present to the eyes separate, visual, stereoscopically related images.

Central problems in the field of practical stereoscopy reside in the fact that conventional apparatus is cumbersome and very expensive, most of the same require a physical septum or a group of septa in order to obtain a true stereoscopic effect, and no systems of which the inventor is aware are adaptable for taking panoramic scenes of the outdoors, for example, and reproducing said scenes satisfactorily for stereoscopic viewing.

Accordingly, an object of the present invention is to provide a method whereby panoramic scenes may be taken photographically and reproduced stereoscopically in a new, unique, and highly desired manner.

A further object of the invention is to provide a method whereby the scenes taken photographically and reproduced optically for stereoscopic viewing is accomplished without the aid of actual or artificial septa relegating respective portions of the reproduced stereoscopic doublets to the respective, individual eyes of the observer.

A further object of the present invention is to provide for the anamorphosizing and the subsequent anamorphoscopic restoring of panoramic sector images in a manner such that a practical lens viewing window may be employed, and this without incurring serious aberration effects.

An additional object of the invention is to devise a camera wherein the viewing window thereof automatically compresses spaced sectors of the panoramic scene being taken, so that the photographic reproduction obtained thereby may be appropriately employed in the inventor's stereoscopic viewing apparatus.

A further object of the present invention is to provide a practical, rigidly constructed camera window and dark chamber structure which will be suitable for producing compressed, overlapping sectors of the panoramic scene being photographed, such sectors being suitable for optical treatment by simple and inexpensive means to enable a faithful, stereoscopic reproduction of the photographed panorama.

A further object of the invention is to provide means for viewing suitable transparencies, photographs, or groups thereof, of panoramic scenes so as to obtain a stereoscopic effect of such scenes.

An additional object is to provide camera windows and composite reproduction viewing windows composed of suitably ground or contoured polygonal (preferably hexagonal) elemental lens means, for enabling the production of a stereoscopic effect in such a manner that distortion and eye strain are minimized.

An additional object is to provide simple means for registering the elemental segments of the objective screen of the viewing apparatus devised by this invention with the elemental lenses used therein so that a rigid, completely registered, satisfactory structure may be obtained for viewing panoramas.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 2 is a front elevation of camera apparatus employing a unique camera window (the window and peripheral outer edge of the camera dark chamber only being seen in the view), which camera window serves to produce simultaneously on the exposable media of the camera, compressed scene sectors which mutually overlap each other and which are regularly spaced apart, e.g. side-by-side.

FIGURE 3 is a transverse horizontal section taken along the line 3—3 and rotated 90° in a clockwise direction for convenience of illustration, and indicates, partially schematically, the composite camera structure.

Figure 1B:
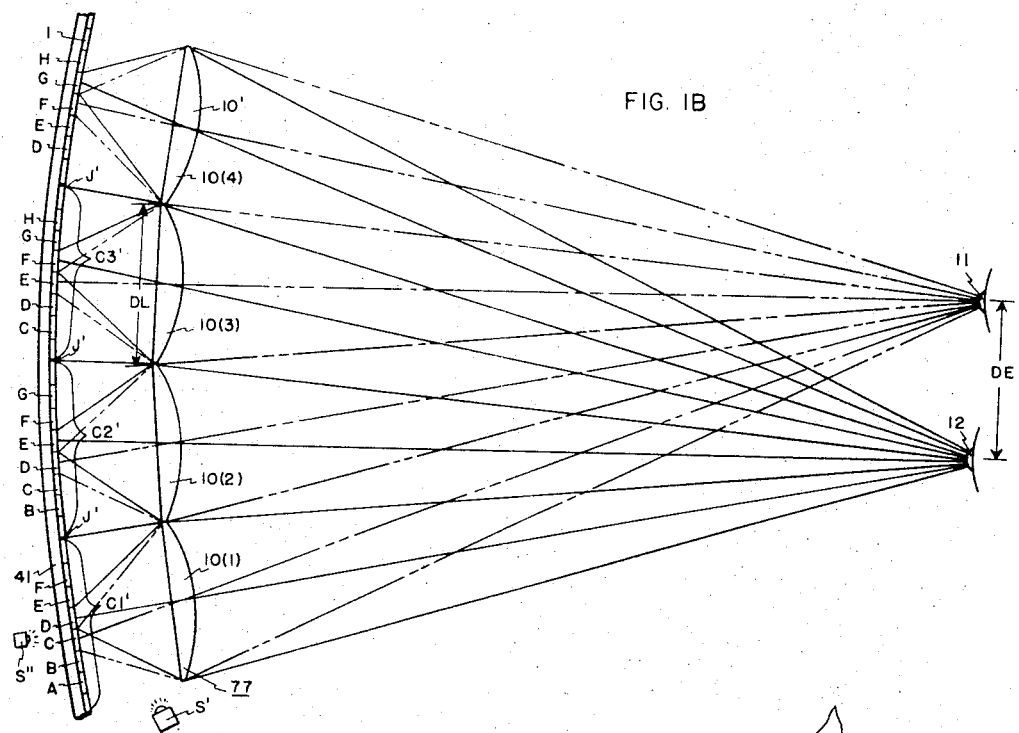
FIGURE 1B is a plan view of one form of optical viewing structure which may be employed to view, stereoscopically, side-to-side disposed reproduction of the stepped scenes taken by the camera of FIGURE 1A, or by alternative camera structure such as is hereinafter described, by way of example.
Figure 1A:
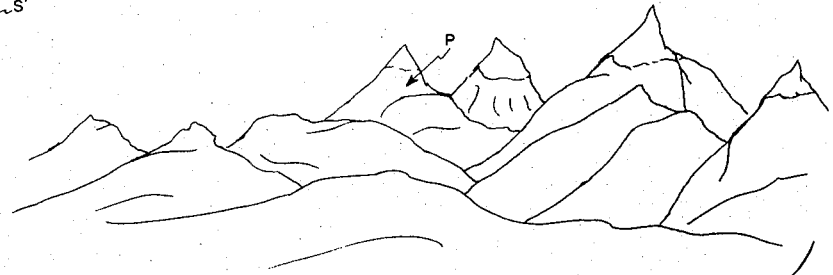
FIGURE 1A is a diagrammatic, perspective view of one form of camera, according to the present invention, which is set up to take a progressive series of exposures, at mutually spaced vantage points, of a panoramic scene; angular displacements of the camera structure is exaggerated for convenience of illustration.
Figure 1A:
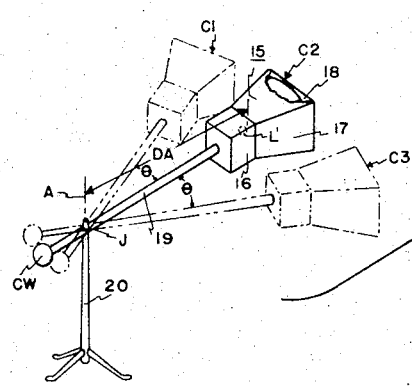

FIGURES 4A, 4B, and 4C are respective embodiments of at least portions of viewing structure which may be used to view reproductions of the exposure produced by the camera apparatus of FIGURE 3 (or of FIGURE 1A); FIGURES 4A, 4B, and 4C differ only in the character of the objective screen of the viewing structure.

Figure 5:
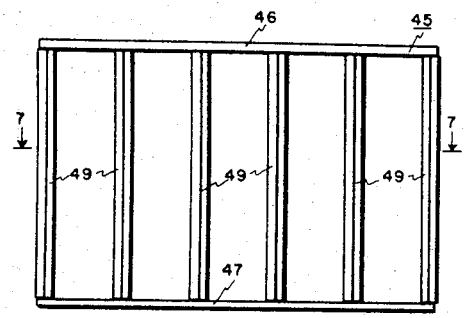
Figure 6:
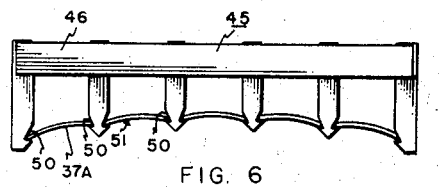
Figure 7:
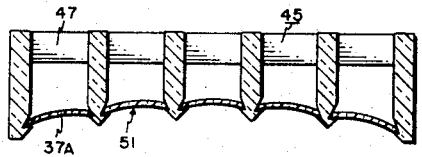

FIGURE 5 is a front elevation of grid structure which may be employed as the objective screen in lieu of those shown in FIGURES 4A, 4B and 4C, and which will include spaced transparencies, for example, (not shown in FIGURE 5 but rather in FIGURES 6 and 7).

FIGURE 6 is a top plan of the structure shown in FIGURE 5 and illustrates the mounting of transparencies (or prints) into the grid structure.

FIGURE 7 is a view similar to FIGURE 6 but is taken along the line 7—7 in FIGURE 5, and is a horizontal transverse section, looking downwardly.

Figures 8A, 8B:
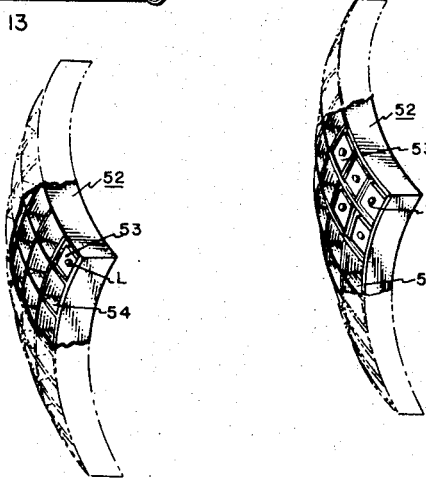

FIGURE 8A is a perspective view, partially broken away and shown in phantom lines, of camera structure which may be used in a second embodiment of the invention, the same incorporating a plurality of cameras the optical axes of which are arranged in a spherically divergent manner; for convenience of illustration only five cameras are shown; howbeit, it will be understood that a respective camera will be disposed in each of the respective camera compartments.

FIGURE 8B is similar to FIGURE 8A, is broken away for conservation of space, and illustrates camera and camera support structure, alternate to that shown in FIGURE 8B, wherein a single camera may be used and progressively displaced to unique camera positions in a successive manner, these camera positions being co-related such that their axes are arranged in mutually, spherically divergent manner.

Figure 9:
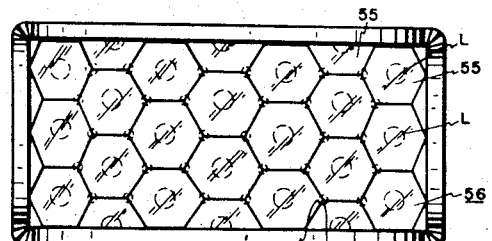

FIGURE 9 is a front elevation of camera means, substantially identical to that shown in FIGURES 2 and 3 and having but a single, conventional exposure mechanism, but wherein the camera window comprises a series of side-by-side disposed, hexagonally shaped elemental lenses, the composite series being arranged in an overall, outwardly spherically convex manner. The dotted lines in the center of each lens are representative of the approximate areas, with interspacing being exaggerated to show lens-exposure relationship, of the individual, simultaneously produced exposures of the respective lenses as made upon the single, exposable medium of the camera.

Figures 10, 11:
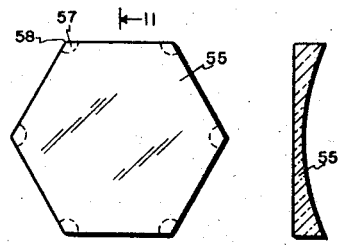

FIGURE 10 illustrates a front elevation detail of one of the representative lenses employed in camera window FIGURE 9.

FIGURE 11 is a vertical section taken along the lines 11—11 in FIGURE 10.

Figure 12:
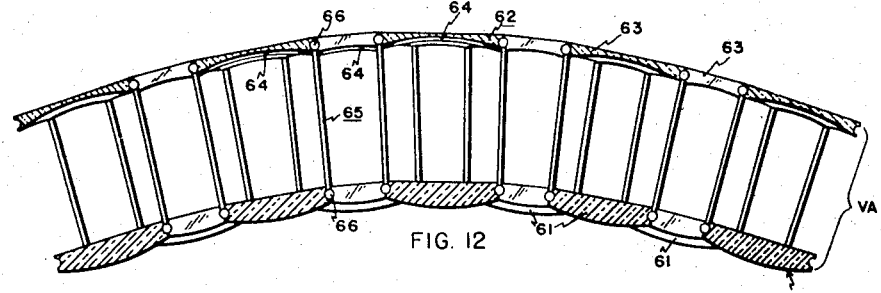

FIGURE 12 is a horizontal section of a preferred type of viewing structure for stereoscopically viewing the camera reproductions obtained by the camera structure shown in FIGURES 8A, and 8B or 9.

Figure 13:
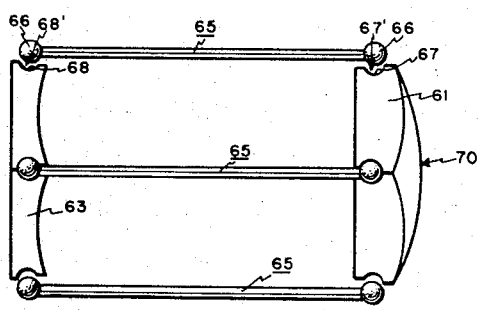

FIGURE 13 is a detail, partially exploded, of one segment of the structure shown in FIGURE 12, indicating the manner of registry of the elemental objective screen segments with the elemental viewing lenses of the viewing window.

Figure 14:
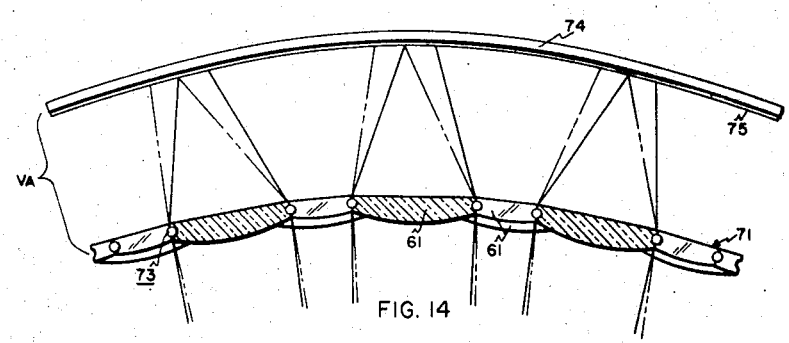

FIGURE 14 is a fragmentary plan, partially in section, of optional viewing structure alternate to that shown in FIGURES 12 and 13, wherein the objective screen merely comprises a regularly curved screen. As may be noted, there need be no segmented registration means as in FIGURES 12 and 13 excepting for the end mounts of the objective screen with respect to the viewing window (not shown).

For a preliminary consideration of the basic concepts involved in the present invention, the reader is respectively referred to FIGURES 1A and 1B.

In FIGURE 1A camera means 15 includes a camera 16 having the usual objective lens system, exposable film, film rolls and shutter (not shown) a dark chamber 17 and a camera window 18. As shown, it is preferable that the camera window 18 be a negative lens so that there will be a compression widthwise of the scene being taken by the camera means 15.

Camera means 15 is mounted to an arm 19 which is horizontally pivotable about tri-pod 20. Counterweight CW may be supplied arm 19 as desired. A journal connection of convenitional design may be disposed at the juncture of the tri-pod support 20 and arm 19. The distance DA between the pivot axis A and the camera window 18 may, for example be equivalent to 7 feet and the progressive angular settings be disposed in angle 0 (in the example given, 2°) apart so that the chord distance between the camera window 18 at any one position and at its adjacent position will happen to be approximately equal to the inter-occular distance (say 2.5 inches) of the viewer.

Conceivably the distance DA can be almost any distance, that is, from a practical minimum distance of but a few feet to a maximum distance approaching infinity. In any case, however, the angular displacement 0 should be of the order of 2° in magnitude; thus, where the distance DA is 7 feet, then adjacent positions of camera window 18 will be about the given inter-occular spacing apart, which is very much preferred for the best possible stereoscopic effect. The lens at camera window 18, while preferably negative as shown, through it may be positive or meniscus, is to provide a compression widthwise (but not vertically) of the scene sector being taken by the camera in any given position so as to compensate for the widthwise distortion of the stereoscopic viewing apparatus hereinafter described. Camera positions C1, C2, and C3, while exaggerated so far as camera displacement is concerned nonetheless illustrate the fact that a first scene section exposure will be taken by the camera at position C1, a second exposure will be taken at position C2 and a third exposure will be taken at camera position C3, this of the panoramic scene P which is illustrated. Because of the angular displacement value, C1 and C2 will be stereoscopic doublets, as will C2 and C3, and so forth.

Prints or transparencies may be reproduced from the exposed media of the camera structure, and these prints (e.g.) may be disposed side-by-side upon an objective screen 41 as shown in FIGURE 1B. Accordingly, the transparency C1' reproduced from the exposure taken when the camera was in position C1 will be disposed as shown in FIGURE 1B. Correspondingly, prints or transparencies C2' and C3' will be disposed progressively in side-to-side relationship, also along the objective screen 41, the latter transparencies or prints being reproductions of exposures when the camera structure 15 was in positions C2 and, subsequently, C3. C1' and C2' are stereoscopic doublets as are also C2' and C3', and so forth.

It will be observed that as wide a panorama may be taken by the camera structure as desired. Thus, if desired, fifty exposures progressively stepped 2° with respect to each other might be taken, or even 180 exposures stepped 2° apart to traverse a complete 360° arc. For purposes of convenience of illustration only a few camera positions are shown; likewise, in FIGURE 1B, the viewing structure of limited extent is shown.

In turning attention to FIGURE 1B in detail, it is seen that the prints, transparencies or other reproductions C1', C2', and C3', as taken from camera exposures in respective positions C1, C2, and C3, are disposed in side-to-side relationships and are progressively disposed upon objective screen 41. Where reproductions C1', C2', and C3' are transparencies, then a light source S' may be disposed rearwardly of objective screen 41 and the latter made translucent so that viewing of the transparencies may be facilitated. Where the reproductions C1', C2' and C3' are simply photographic prints, then a light source S' may be disposed in front of the objective mounting screen 41 so that these prints may be properly illuminated. Conceivably, other forms of reproduction may be used such as a means whereby the stepped scene sectors may be projected onto the objective screen 41 in side-to-side relationship. The use of other types of reproductions is also possible.

It is to be remembered that in the case of FIGURE 1B we are looking down upon a plan view of an optical system, and the upper edges of the transparencies or prints C1', C2' and C3' are observed. The prints themselves will generally be in some appropriate rectangular form, although other forms conceivably are possible. The several junctures J' of adjacent reproductions C1', C2', and C3' are shown. Conceivably, there may exist some definite spacing between adjacent reproductions. However, it is believed most satisfactory if these reproductions are as closely spaced together in side-to-side relationship as possible. Finally, the reproductions may be disposed upon a single strip (transparency or print, for example) by the employment of the camera means illustrated in FIGURES 2 and 3 hereinafter to be described.

The several lenses 10(1), 10(2), 10(3), and 10(4) comprise a viewing window 77. While, conceivably, the objective screen 41 and viewing window 77 may be flat, it is desired that both be concave outwardly (toward the viewer) so that distortion will be minimized and the viewing device made as wide as possible, as desired.

Viewing window 77, as before mentioned, is comprised of a plurality of mutually adjacent or contiguous elemental lenses.

Although such need not necessarily be the case, it is desired that the inter-occular distance DE and the width DL of each of the lenses be equivalent where the observer is 7 feet away from the object screen 41. Inter-occular distance for the average observer is roughly 2½ inches. The lenses 10 themselves are narrow, vertically elongate positive lenses which may take the form of plano, cylindrically convex lenses having the convex surface disposed on the side toward the viewer. While the outer surfaces 10' may be cylindrical as shown, they may also take other curvatures so as to correct for aberation effects. It is desired, however, that the lenses be curved only in a transverse plane (in the plane of the drawing) but not in a vertical upright plane. Thus, the lenses may be thought of as upstanding, rectangular, parallelopipeds with the exterior surface thereof being cylindrically curved, for example, about a vertical axis. As to other physical characteristics and dimensions, the focal length of the individual lenses 10 may be of the order of 5½ inches and the objective screen 41 a distance of approximately 4 inches from the composite viewing window 77, both of the latter having preferably the same center of curvature. In any event, the distance between the composite lens structure comprising viewing window 77 and the series of reproductions C1, C2 and C3 disposed upon objective screen 41 must be less than the focal length of the lens. Parenthetically, it should be mentioned at this juncture that it is desired that the focal length of all of the lenses 10 be equal. For panoramic viewing, it is true that while the viewing window 77 and objective screen 41 may be flat, i.e. with a radius of curvature equal to infinity, yet it is desired that both be concave outwardly toward the observer and have the same radius of curvature which, for least distortion, should be approximately equal to the distance DA at which distance the width of the individual lenses should subtend an angle of the order of 2°. Where the observer is much farther removed from the viewing window 77, then the width DL of the individual lenses should be made larger so that each lens will subtend an angle of 2° of thereabouts for optimum viewing. The 2° figure, while somewhat arbitrary is that figure generally agreed upon by those skilled in the art as being the optimum, stereoscopic viewing angle, and that the stereoscopic effect is gradually reduced as this angle is reduced.

In FIGURE 1B, but three of a series of reproductions (the three being C1', C2' and C3') are indicated. However, it will be understood that the screen generally will be much wider than shown and the number of side-by-side disposed scene sector reproductions much greater. The drawing, however, suffices to illustrate the scientific principles involved. It will be noted that the scene sections of the side-by-side disposed reproductions C1', C2' and C3' thus, the detail of each of which overlap, progress as to respective scene sections of the panorama photographically taken. Thus, the elemental vertical strip area A of transparency C1' will not be found in any of the other reproductions C2', C3', and so forth. Adjacent the elemental vertical strip A in print or transparency C1' is elemental strip area B. A strip B, stereoscopically related to the former strip B of C1', is found in reproduction print or transparency C2' which is adjacent reproduction C1'. However, in the event of the vertical strip area B in C2', while the same shows the same subject or group of subjects (save for extreme fringe areas as to background), these subjects will have been taken by camera structure 15 in FIGURE 1A at a displaced vantage point. Thus, vertical strip area B in C2' will have been taken when the camera structure 15 was at position C2. Where camera displacement between adjacent camera positions is of the order of 2°, then the observer will see by his eyes 11 and 12 the vertical strip areas B and B of respective reproductions C1' and C2' as he would see the same in nature. This is true not only by virtue of the above discussion, but also by virtue of the fact that camera window 18 will compress the scene being taken widthwise, whereas lenses 10 will expand the scene widthwise (since virtual, enlarged images are seen by the eyes 11 and 12). To accomplish such compression, it is desired that the lens comprising camera window 18 be negative in one direction, e.g. a plano-concave lens with the concave surface being cylindrical about a vertical axis; howbeit, a similar but positively ground lens might serve equally as well. In the latter event, however, the distance between the camera lens L' and the camera window 18 would have to be made longer. In any event, the right eye 11 of the observer will look through lens 10(2) and see vertical strip area D of reproduction C2', whereas eye 12 will view through lens 10(1) and see vertical strip area D of reproduction C1'. These elemental strip areas, while representing compressed scene sectors by virtue of the negative character of camera window C2, will be magnified to the width of each respective lens.

Optical lines for the right eye 11 are drawn in phantom lines, whereas the optical lines associated with eye 12 are drawn in solid lines. By virtue of the refraction of each lens, the rays from the vertical strip areas of the transparencies will cross so that, as regards scene sector reproduction C1', the right eye 11 will see the elemental vertical strip area C whereas the left eye 12 will see the vertical strip area D. Thus, the eyes view two different, preferably non-overlapping (though a slight overlapping may not be unduly objectionable) areas of reproduction C1' when these eyes are both looking through the same lens 10(1), this being due to refraction by lens 10(1) and its spacing from objective screen 41. Therefore, what is produced is an optical phenomenon which supplants the necessity or use of a physical septum so as to preclude one eye from seeing what the other eye sees behind the same lens. It is well known in connection with the old-fashioned stereoscope, wherein the observer looks through a device to view two stereoscopically related pictures, that a physical septum or barrier must be disposed between the eyes and the juncture of the pictures so that the eye on the right can only view the right picture and the eye on the left only the left picture. One eye must not see that which the other eye sees. By the present invention, this is made possible because of the refraction of lens 10(1), for example, and the distance prescribed between the lens viewing window 77 and the objective screen 41.

When one traces the optical ray lines shown, it will be noted that the right eye 11 sees one panorama (vertical strip areas C of C1', D of C2', and E of C3', and so forth). Correspondingly, the left eye 12 sees vertical strip areas D of C1', E of C2', F of C3', and so forth. Again these vertical strip areas are magnified by the lenses 10 and the same will present continuous, respective panoramas (some scene section overlap being permissible) for each of the eyes 11 and 12, respective viewed sections of which are mutually related as stereoscopic doublets. Thus, one viewed section of one panorama as viewed by one eye will be the stereoscopic doublet of another viewed section of the remaining panorama as viewed by the remaining eye.

Again, the curvature of lenses 10(1), 10(2), and 10(3), and 10(4) provides for the optical separation of the vertical strip areas as seen through one lens so that one eye may not see that which is seen by the remaining eye.

Hence, this basic stereoscopic requirement of supplying actual or equivalent septum is satisfied and this without the aid of physical septa as have in the past been employed. In the process of this separation there is a distortion, i.e. an expansion widthwise of the viewed reproduction scene. But, there is also a compression widthwise of the scene by virtue of the camera structure taking the picture as hereinbefore described. The compression by the camera is compensated for by the expansion by the individual lenses of viewing window 77. In the langauge of optics, the reproductions C1', C2' and C3', in being compressed widthwise will be anamorphoses of the scene sectors taken by the camera structure 15. Lenses 10 accomplish an anamorphoscopic restoration of the viewed scene sector reproduction so that the eyes 11 and 12 will see a faithful, optically treated reproduction of the panoramic scenes previously taken, this such that there will be no anamorphoses of images when viewed through the viewing window structure 77.

It is obvious that there are many interrelated factors to be considered in accomplishing the results desired. Focal length and exterior curvature of lenses 10 must be determined in accordance with desired screen spacing so that the artificially produced septa phenomenon may be realized so as to accomplish a separation of images seen through one lens. This criterion being satisfied, there remains merely for the distance of dark chamber 17 and the negative focal length of camera window 18 to be determined such that the width-wise compression of the scene being taken will be exactly offset by the image expansion of lenses 10. The degree of expansion may be calculated rather simply by conventional techniques, as by geometrical construction and the laws regarding similar triangles in combination with the thin lens formula. (See chapter 3 of The Principles of Optics by Hardy and Perrin, published by McGraw-Hill, 1932 edition.) In the example given and for the values above enumerated, a planoconcave window 18 having an inner surface radius of curvature equivalent to the radius of curvature of convex surface 10' of FIGURE 1B will be sufficient for the desired conditions above enumerated to be met.

Referring again to FIGURES 1A and 1B, for example, it may be noted that the relationship of the radius of curvature of the viewing window 77 to the distance DA may be varied both ways from equivalent values so as to extend or reduce, as desired, the visual apparent distance of distant objects and the degree of stereoscopic effect desired for such objects.

In FIGURES 2 and 3 the camera 21, capable of taking stepped scene sectors simultaneously so that no progressive camera displacement is needed, is shown to include a conventional objective lens system 22, conventional shutter mechanism 23, and exposable image receiving medium 24 rolled upon conventional film rollers 25 and 26. If desired, the exposable medium 24 is preferably disposed in a channel track 27, indicated schematically, which insures a curved image receiving surface 28 to be exposed. Less distortion is incurred if the image receiving surface 28 is concave, having a radius center at the center of the objective lens system 22 of the camera, and if the camera aperture opening is very small ($f/54$ or higher). (In the case of such a small aperture, a high film speed (of the order of 3000 or higher) will be required.)

Dark chamber 29 may be fabricated simply of heavy black paper or cardboard, for example, is cooperatively disposed with camera 21 about objective lens 22 and includes a camera window 30 of which a plurality of elongate, upstanding, camera lenses 31 (similar to lens 18 in FIGURE 1A) form a part. The lenses, i.e., lenses 31, are preferably negatively ground or contoured, so that the images formed upon the exposable medium 24 will not have to be cut into strips and reversed.

However, while negative lenses are preferred in some instances it is possible that positive or meniscus lenses might be used as the camera window lenses 31. In such event, however, as before mentioned, the reproduction would have to be cut apart and reversed in over to have a viewable image screen operatively associated with the rest of the inventor's structure.

The several lenses 31 are secured within the dark chamber window metallic strip 32 and preferably are recessed at 33, at both of the elongate vertical edges of the respective lenses, so as to receive vertical connecting rods 34 at the mutual cavities 35 formed by the recesses 33. These rods 34 may be made of glass or metal or plastic, and are fused to adjacent lenses 31 either directly, by means of adhesive, or by other suitable means.

In correlating with the structure and dimensions heretofore given, the nominal distance X may be chosen to be 7 feet and the width W of lenses 31 chosen to be 2½ inches (equal to interoccular spacing so that the lenses will subtend a 2° angle). The lenses may be so ground or contoured on their reverse side 36 as to have an optimal view divergency of, say, 32°. These figures are representative only; other values might equally be established. The 2° figure is simply an arbitrary figure but one which has been generally agreed upon in the optics industry as being equivalent to the arcuate subtend most pleasing to observers for stereoscopic natural vision. If the user agrees upon this figure, which is generally accepted as a nominal value in the industry, then the lens width W of lenses 31 and the distance X will be determined accordingly. The manner in which the individual lenses 31 are ground so as to achieve the diversion angle (here 32°) desired for the compression required, will depend on the variables of the viewing apparatus as above enumerated. While the camera window 30 is shown outwardly, cylindrically convex, the same might conceivably be flat and the individual lenses suitably ground to preserve the scene sector compression desired.

FIGURES 4A, 4B, and 4C are plan view, physical representations of viewing structure similar to that schematically shown in FIGURE 1B. In FIGURE 4A, the objective lens segments 13 have stepped transparencies 37A, 37B, 37C, and 37D disposed on their respective faces. These may be clipped in place as hereinafter described, they may be secured upon the surfaces 14 by an adhesive, or other means may be used to secure the transparencies. It will be understood, as explained in FIGURE 1A, that for photographic reproductions to be used on the objective screen, positive prints or other means might be used instead of the transparencies. Transparencies have been throughout most of the rest of the figures simply to indicate one manner in which intelligence bearing indicia may be disposed upon the various surfaces 14 of the objective screen segments 13. In the case of viewing apparatus the lenses 10 must of course be positively ground or otherwise molded or contoured. In FIGURE 4A a plan view of the lenses 10 is shown; it will be understood that these lenses correspond in proportion to lenses 31 in FIGURE 2 of the camera means. Preferably, the elongate edges 39 of these lenses are also recessed so as to receive a plurality of connecting rods 40, made of glass, plastic or metal, and fused to, cemented to, or otherwise secured to adjacent ones of the lenses 10. The several lines R merely indicate view or optical lines leading from the eyes of the observer to those portions of the respective transparencies actually seen by the eye. For convenience of illustration, the optical lines associated with both eyes of the observer are shown. For the optical lines associated with both eyes and both images, references to FIGURE 1B may also be made.

While slightly less satisfactory, it should be mentioned that the objective screen 41, rather than having individual or integral concave elemental segments as objective screen at 13' in FIGURE 4A, may be simply a regularly concave plate and have a separated or continuous strip of progressive sectors of the photographed scene disposed upon surface 14'. Such a transparency strip, if used, is indicated at 42 in FIGURE 4B. Of course, the transparency strip or regular series of strips 43 may be disposed upon simply a vertical flat objective screen plate 44 as in 4C.

FIGURES 5 through 7 indicate a certain type of concave grid structure 45 which may be employed to amount a series of transparencies to form the objective screen in FIGURE 4A. The grid structure may comprise a pair of top and bottom support rails 46 and 47 between and to which a plurality of spaced bars 49 are fixed as by attachments, adhesive, or other means. These bars should be supplied with recesses 50 as shown in FIGURE 6 into which the transparencies 51 may be placed. (These transparency series 51 correspond to the series of transparencies 37A, 37B, 37C, and 37D in FIGURE 4A.) Thus, the transparency series 51 will be appropriately, concavely, mounted in a series of scallops 14 (as in FIGURE 4A), in the grid structure 45 where inter-bar spacing of bars 49 is less than the width of the transparencies involved. (See FIGURES 6 and 7.)

The foregoing discussion has pertained to distorting and restoring subjects which compress and expand in one direction only, this by virtue of the cylindrically configured elongate lenses of both the camera window and the viewing window. It shall now be mentioned that other constructions are possible wherein compression and expansion is omni-directional. Reference is now made to FIGURES 8A, 8B and 9.

In FIGURE 8A is disclosed a camera frame 52 being provided with a plurality of cameras 53 each having lenses 11, and each of the cameras being disposed in a respective one of the compartments 54 of frame 52. For convenience of illustration only a fragmentary portion of the structure is shown. It will be understood that the compartments 54 of frame 52 are disposed preferably along horizontal and vertical lines as shown. For convenience of illustration only a few cameras at 53 are illustrated. It will be understood, however, that there will be disposed a camera 53 in each of the respective compartments 54. The shutters of the cameras may be either all ganged together for simultaneous operation, or they may be operated independently when still panoramas are being photographed. The exposed negatives of the cameras must be but together in a mosaic, keeping the same relative positioning as their respective cameras, in order that thet same may be viewed by the inventor's viewing structure hereinafter to be described.

For optimum results it is desired that the axes of the cameras mutually diverge outwardly. Thus, the frame preferably is spherically convex outwardly so as to achieve the desired results.

In FIGURE 8B is illustrated a structure similar to FIGURE 8A. This time, however, frame 52, having the plurality of compartments 54, is supplied with but one camera 53 having lens L. The one camera may be moved progressively along a pre-determined pattern so as to be disposed successively in successive ones of the totality of the compartments of the frame 52. Thus, the exposures will be all on a single negative roll. However, the exposures must be cut apart and a mosaic made of them in desired relative sequence so that the complete panoramic view may be properly seen through the inventor's viewing apparatus.

In FIGURE 9 a camera similar to the structure of FIGURE 2 is employed. The camera window 56 thereof is supplied with a plurality of polygonal camera lenses 55 which are secured together in side-to-side relationship. Preferably, the vertices 59 of the lenses are recessed so as to include balls 60 cemented therebetween to secure the composite camera window 56 together. In connection with the structure of FIGURE 9 there will be a single "camera" (i.e. single exposure mechanism) in order that the spherical scene sectors respectively viewed by the respective lenses may expose, in a corresponding mosaic pattern, the film or photographic plate of the camera. Enlargements may be made thereof and the same, in the form of transparencies or prints of a single composite composition, viewed by the inventor's viewing structure. The structure of FIGURE 9 has the advantage, over that shown in FIGURES 8A and 8B, of producing a mosaic exposure pattern on a single photographic plate or film strip, with the mosaic pattern corresponding exactly to the views taken and being adapted for directly producing negatives or transparencies for appropriate viewing.

As to FIGURES 8A and 8B there will occur to the mind other types of positioning means which may be used for the camera or cameras rather than frame 52. Thus, a progressively stopped arm and universal joint might conceivably be used; for other types of structure in the moving picture industry, for example, for switching one or more cameras from one discrete position to another discrete position.

The camera window viewing lenses 55 are detailed in FIGURES 10 and 11, may be comprised of glass or suitable plastic, and preferably have vertex recesses 57 at the several vertices 58. These are employed to form mutual cavities 59 which receive connecting balls 60, the latter being formed of metal, plastic or glass and fused or cemented to adjacent lenses at the cavity areas 59.

FIGURE 12 is a horizontal transverse section, looking downwardly, of one type of the inventor's viewing structure which is adapted to view a reproduction mosaic of a panoramic scene as prepared from the integral or joint exposure negative taken by the camera structures of either 8A, 8B or 9. Polygonal lenses 61 in FIGURE 12 are joined together in much the same way as the polygonal lenses in the camera window of FIGURE 9. The objective screen 62 is composed of a plurality of polygonally shaped objective screen segments 63 which are secured together as hereinafter described. The manner of securing together the elemental objective screen segments 63 shall be discussed hereinafter. It suffices at this note that the transparencies or prints 64 as taken by the camera structure of FIGURES 8A, 8B or 9 is disposed on the front surface of the objective screen segments 63.

As illustrated in FIGURE 12, it is desirous that both the viewing window 70 and the objective screen 62 be concave, and this preferably spherically, in order that large panoramas may be accommodated and truly perceived in correct form and with a minimum of distortion. Of couse, the viewing structure of VA at FIGURE 12 as hereinafter described may take another form as that shown in FIGURE 14. This time, however, the viewing window 71, while similar to that shown in FIGURE 12, need not be physically connected to the objective screen 74 in the manner as illustrated in connection with FIGURES 12 and 13. However, the transparency or print mosaic 75 will be disposed on the front surface of objective screen 74 in an order to facilitate the viewing of the panorama.

FIGURE 13 is a detail of the viewing window objective screen securement structure. As shown in FIGURE 13, the several elemental viewing screen segments 63 are provided with spherical recesses 68, and spherical recesses 67 are supplied the elemental lenses 61. Rods 65 are provided with balls or spheres 66 on both ends thereof which seat into the recesses 67 and 68 before described. Thus, the rods 65 not only serve to fixedly interspace the elemental lenses with the objective screen segments 63, but also the balls 66 and the ends thereof serve to interconnect the objective screen 62 proper and also the viewing window 70 proper.

The manner of operation of the structure illustrated in FIGURES 12, 13, and 14 is substantially the same as that described in connection with the previous embodiments of the invention. The elemental lenses 61 serve to separate the spherical (this time) area images so that the right eye will not see what the left eye sees. However, one eye of the observer will observe one complete panorama, with the images "filling" the elemental lenses 61, and the remaining eye will see an additional panorama. Corresponding sectors of each panorama will be stereoscopically related when as in the FIGURE 1B case, adjacent reproductions are stereoscopic doublets, the viewing window objective screen interspacing is the same as in the case of FIGURE 1B, for example, and the focal lengths of the polygonal lenses are mutually equivalent and all greater than the distance between the objective screen 62 and the viewing window 70. Corresponding analysis will apply in the present instance as in the case of FIGURE 1B.

It is proven desirable to use hexagonal configurations for the individual lenses 61 and objective screen segments 63. Other polygonal forms such as three-, four-, five-, and seven-sided figures are possible. However, the above is a definitely advantageous structure. Elements 64 may be either transparencies or prints as before. External light sources may be used as in the case of FIGURE 1B.

While conceivably the structure may assume a planar form, the forms of FIGURES 12 and 14 are deemed preferable. Where the structure of FIGURE 12 is used, then, to minimize distortion, the objective screen segments 63 should be spherically concave and in registry with the elemental lenses 61 as shown.

While the several viewing windows (77 in FIGURES 4A–4C, 70 in FIGURE 12 and 71 in FIGURE 14, respectively) have been described as concave outwardly toward the viewer, either cylindrically (see FIGURES 4A–4C) or spherically (see FIGURES 12 and 14), these viewing windows of the composite viewing apparatus VA might conceivably be planar where the panoramic reproduction to be viewed is of short girth. Less distortion will be incurred, particularly for wide-sweep panoramic scenes, where the respective viewing windows VA are in fact concave toward the viewer.

It has been mentioned previously that the lenses employed could be corrected for various aberrations, as desired. Where the surfaces of the lenses of the viewing apparatus are strictly cylindrical or spherical, a "pin-cushion" type distortion of the viewed images will result to some degree. This can be compensated for appropriately by reconstituting the objective system of the camera apparatus, whether by repositioning the diaphragm in front of the objective lens system or by otherwise reconstituting the objective lenses of the camera, so that the camera will automatically distort the exposures taken such that the latter will exhibit a "barrel" effect. This may be determined in such degree as to compensate exactly for the pin-cushion effect of the viewing window.

The method inherently involved in producing stereoscopically viewable panoramas, detailed in the above description of the preferred apparatus which the inventor employs and the stereoscopic reproduction process accomplished thereby, may be succinctly summarized as follows: photographing and photographically compressing overlapping sections of said panoramic scene, in regular, uniquely stepped angular progression, to obtain a progressive series of side-by-side disposed section images, adjacent ones of which are stereoscopic doublets; and optically, anamorphoscopically restoring selected portions of said images, the portions selected depending upon the position of the respective eyes of the observer, to produce two continuous panoramas each viewable by a respective eye of the observer, and not by his remaining eye, corresponding portions of said panoramas being steroscopic doublets.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. Stereoscopic panorama reproduction viewing apparatus including, in combination: an objective screen bearing a progressive series of mutually equally displaced, horizontally compressed, detail overlapping, stereoscopically-related viewable sections of a panoramic scene which are disposed side-by-side and are regularly successive, said sections respectively comprising complete photographic recordings of sections of a panoramic scene taken from successive camera viewpoints along a pattern which is convex toward the panoramic scene being taken; and an anamorphoscopic viewing window means disposed in front of said objective screen and comprising a multiplicity of positive, anamorphoscopically restoring elemental lens means, which have equivalent focal lengths, are disposed in side-by-side relationship, and are individually in registration with said stereoscopically-related viewable sections, respectively, for respectively, anamorphoscopically restoring individually, visible elemental areas of said viewable sections, which depend for their selection upon the horizontal position of each eye of each viewer with respect to each of said elemental lens means, to produce two, individually continuous panoramas as seen by the respective eyes of each viewer thereof, corresponding portions of said viewable sections being stereoscopic doublets, and the distance between said viewing window and said objective screen being less than the focal lengths of said elemental lens means and wherein said objective screen and said viewing window are mutually curved with respect to observers thereof and have a degree of curvature nominally equal to the degree of curvature of the adjacent camera viewpoints from which said viewable sections had been stereoscopically recorded, but opposite thereto.

2. Structure according to claim 1 wherein said objective screen is translucent, said panoramic viewable sections comprising respective scene image transparencies.

3. Structure according to claim 1 wherein said panoramic viewable sections are photographic prints, and wherein said panoramic reproduction viewing apparatus also includes light source means illuminating said prints.

4. Structure according to claim 1 wherein said viewable section images are projected onto the rear surface of said objective screen in individual correspondence with each elemental lens means of said viewing window.

5. Structure according to claim 1 wherein said positive elemental lens means comprise elongate cylindrical lenses mutually secured together in side-by-side relationship along their short dimension.

6. Structure according to claim 1 wherein said apparatus includes a grid, said viewable sections being photographic reproductions which are mounted in said grid, said grid having mutually spaced reproduction-retaining recesses for releasably mounting said reproductions in their intended side-by-side disposition.

7. Stereoscopic panorama reproduction viewing apparatus including in combination: an objective screen with a predetermined curved contour toward a viewer, said contour depending on the curve of the pattern of recording of a panoramic scene, said screen bearing a progressive series of mutually equally displaced, detail overlapping, viewable section images of a panoramic scene previously recorded which are disposed side-by-side and are regularly successive, said sections respectively comprising complete photographic recordings of sections of a panoramic scene taken from successive camera viewpoints along a pattern which is convex toward the panoramic scene being taken; and a similarly contoured viewing window disposed in front of said objective screen and comprising a multiplicity of positive, elemental, lens means, which have equivalent focal lengths, are disposed in side-by-side relationship, and are individually in registration with said section images, respectively, for respectively, optically restoring said section images which depend for their selection upon the relative position of each eye of each said viewer relative to each of said lens means in said viewing window, of respective ones of said panoramic section images to produce two, individually continuous panoramas, each seen by a single eye of said observer and not by his other eye, corresponding portions of which section images are stereoscopic doublets, the distance between said viewing window and said objective screen being less than the focal lengths of said elemental lens means.

8. Structure according to claim 7 wherein said predetermined contour is a curve the radial center of which lies between two feet and infinity in the focal plane of the camera pattern from which was stereoscopically recorded said viewable section images.

9. Structure according to claim 7 wherein said objective screen and said viewing window are equally curved in contour with respect to the viewers thereof, and which degree of curvature depends on the contour pattern of the camera means which recorded said viewable section images stereoscopically to provide the contour of said screen and window, the curvatures of said screen and window being nominally equal but opposite to the pattern of said camera means.

References Cited

UNITED STATES PATENTS

| | | | |
|---|---|---|---|
| 1,918,705 | 7/1933 | Ives | 88—29 |
| 2,140,702 | 12/1938 | Kanolt | 88—29 |
| 2,271,196 | 1/1942 | Kaszab | 88—29 |
| 2,361,347 | 10/1944 | Brown | 88—29 |
| 2,501,258 | 3/1950 | Bonnet | 88—29 |
| 2,833,176 | 5/1958 | Ossoinak | 88—1 |

FOREIGN PATENTS

| | | |
|---|---|---|
| 750,154 | 8/1933 | France. |
| 492,186 | 9/1938 | Great Britain. |
| 466,823 | 10/1952 | Italy. |

JEWELL H. PEDERSEN, *Primary Examiner.*

O. B. CHEW, *Assistant Examiner.*